(12) United States Patent
Iwata et al.

(10) Patent No.: US 12,392,933 B2
(45) Date of Patent: Aug. 19, 2025

(54) GLASS PLATE STRUCTURE AND ON-VEHICLE DISPLAY DEVICE

(71) Applicant: AGC Inc., Tokyo (JP)

(72) Inventors: Yukihiro Iwata, Tokyo (JP); Masabumi Ito, Tokyo (JP); Jun Ito, Tokyo (JP); Akihisa Ishino, Tokyo (JP)

(73) Assignee: AGC INC., Tokyo (JP)

(*) Notice: Subject to any disclaimer, the term of this patent is extended or adjusted under 35 U.S.C. 154(b) by 514 days.

(21) Appl. No.: 17/881,559

(22) Filed: Aug. 4, 2022

(65) Prior Publication Data

US 2022/0373716 A1 Nov. 24, 2022

Related U.S. Application Data

(63) Continuation of application No. PCT/JP2021/003998, filed on Feb. 3, 2021.

(30) Foreign Application Priority Data

Feb. 13, 2020 (JP) .............................. 2020-022169

(51) Int. Cl.
*G02B 1/11* (2015.01)
*B60K 35/00* (2024.01)
*B60K 35/40* (2024.01)

(52) U.S. Cl.
CPC ............... *G02B 1/11* (2013.01); *B60K 35/00* (2013.01); *B60K 35/425* (2024.01); *B60K 2360/60* (2024.01)

(58) Field of Classification Search
CPC .......... G02B 1/11; G02B 1/115; B60K 35/00; B60K 2360/60; B60K 35/425; B60K 35/22
See application file for complete search history.

(56) References Cited

U.S. PATENT DOCUMENTS

2015/0229745 A1  8/2015  De Wind
2019/0346603 A1  11/2019  Sahara et al.
(Continued)

FOREIGN PATENT DOCUMENTS

CN   110596793 A   12/2019
CN   110712399 A   1/2020
(Continued)

OTHER PUBLICATIONS

European Extended Search Report issued in corresponding European Patent Application No. 21753201.9 dated Jan. 2, 2024 (6 pages).
(Continued)

*Primary Examiner* — Ryan D Howard
(74) *Attorney, Agent, or Firm* — Foley & Lardner LLP

(57) ABSTRACT

A glass plate structure includes: a glass plate having first and second major surfaces; an antireflection film; and a print portion. The first major surface includes: a curved surface region that is a region of an end portion of the glass plate, is curved convexly, and has a radius of curvature r that is 50% or more of a thickness t of the glass plate; and a flat surface region that is connected to the curved surface region. The antireflection film is a laminate in which a high refractive index layer and a low refractive index layer are laminated alternately. The number of layers of the antireflection film is 12 or smaller. A total thickness of the antireflection film in the flat surface region is 400 nm or smaller. A thickness of an outermost layer of the antireflection film in the flat surface region is 90 nm or larger.

7 Claims, 2 Drawing Sheets

(56) References Cited

U.S. PATENT DOCUMENTS

2019/0383971 A1 12/2019 Tachibana et al.
2020/0018872 A1 1/2020 Fujii et al.

FOREIGN PATENT DOCUMENTS

| CN | 202137661 U | 2/2021 |
| JP | 2017-181146 A | 10/2017 |
| JP | 2018-197176 A | 12/2018 |
| WO | WO-2018/110499 A1 | 6/2018 |

OTHER PUBLICATIONS

International Searching Authority, "International Search Report," issued in connection with International Patent Application No. PCT/JP2021/003998, dated Apr. 20, 2021.

International Searching Authority, "Written Opinion," issued in connection with International Patent Application No. PCT/JP2021/003998, dated Apr. 20, 2021.

GLASS PLATE STRUCTURE AND ON-VEHICLE DISPLAY DEVICE

CROSS-REFERENCE TO RELATED APPLICATIONS

This is a bypass continuation of International Patent Application No. PCT/JP2021/003998, filed on Feb. 3, 2021, which claims priority to Japanese Patent Application No. 2020-022169, filed on Feb. 13, 2020. The contents of these applications are hereby incorporated by reference in their entireties.

TECHNICAL FIELD

The present invention relates to a glass plate structure and a vehicular display device.

BACKGROUND ART

Conventionally, a glass plate structure having a glass pate, an antireflection film formed on a first major surface of the glass plate, and a print portion (frame portion) formed on a second major surface of the glass plate is used as a cover glass of display devices such as vehicular display devices (Patent document 1).

CITATION LIST

Patent Literature

Patent document 1: JP-A-2018-197176
Patent document 2: WO 2018/110499

SUMMARY OF INVENTION

Technical Problem

In recent years, glass plate structures have come to be used in which an end portion of a first major surface is curved convexly.

The present inventors have found a phenomenon that in such a glass plate structure the end portion looks red when it is seen from the side of the first major surface (hereinafter also referred to as "end portion red coloration."

Where such a glass plate structure is used as a cover glass of a display device in a state that its end portion is exposed, the user of the display device will see end portion red coloration.

Since red is what is called a warning color, the user of the display device may feel the end portion red coloration uncomfortable. There is another probability that the user of the display device erroneously recognizes the end portion red coloration as, for example, occurrence of an abnormality or failure of the display device.

Patent document 2 discloses, in Test Example 2, a 19-layer antireflection film (total thickness: 621.3 nm). A study of the inventors showed that such an antireflection film provides, to a certain extent, an effect of suppressing end portion red coloration. However, a very complex manufacturing process is necessary because of too large a number of layers of the antireflection film.

In view of the above, an object of the present invention is to provide a glass plate structure in which the number of layers of an antireflection film is small and that can suppress end portion red coloration.

Solution to Problem

The present inventors have studied diligently and found that the above object can be attained by employing the following configurations.

That is, the invention provides the following items [1] to [7]:

[1] A glass plate structure including a glass plate having a first major surface and a second major surface, an antireflection film provided on or above the first major surface, and a print portion provided on the second major surface, wherein the first major surface has a curved surface region that is a region of an end portion of the glass plate, is curved convexly, and has a radius of curvature r that is 50% or more of a thickness t of the glass plate and a flat surface region that is connected to the curved surface region; the antireflection film is a laminate in which a high refractive index layer and a low refractive index layer are laminated alternately; the number of layers of the antireflection film is 12 or smaller; a total thickness of the antireflection film in the flat surface region is 400 nm or smaller; and a thickness of an outermost layer of the antireflection film in the flat surface region is 90 nm or larger.

[2] The glass plate structure according to item [1], wherein the glass plate is subjected to chemically strengthening treatment.

[3] The glass plate structure according to item [1] or [2], further including an antiglare layer provided on the first major surface.

[4] The glass plate structure according to any one of items [1] to [3], wherein the outermost layer of the antireflection film is a low refractive index layer containing silicon oxide.

[5] The glass plate structure according to any one of items [1] to [4], wherein the number of layers of the antireflection film is nine or smaller.

[6] The glass plate structure according to any one of items [1] to [5], wherein the number of layers of the antireflection film is four or larger.

[7] A vehicular display device including a display panel and the glass plate structure according to any one of items [1] to [6] that covers the display panel.

Advantageous Effects of Invention

The invention can provide a glass plate structure in which the number of layers of an antireflection film is small and that can suppress end portion red coloration.

DESCRIPTION OF EMBODIMENT

An embodiment of the present invention is hereinafter described with reference to the drawings. However, the invention is not limited to the following embodiment. Various modifications and replacements can be made in the following embodiment within the confines of the scope of the invention.

How to determine a thickness t of the glass plate, a radius of curvature r of a curved surface region, and a thickness of an antireflection film is described later.

[Glass Plate Structure]

Figure 1:
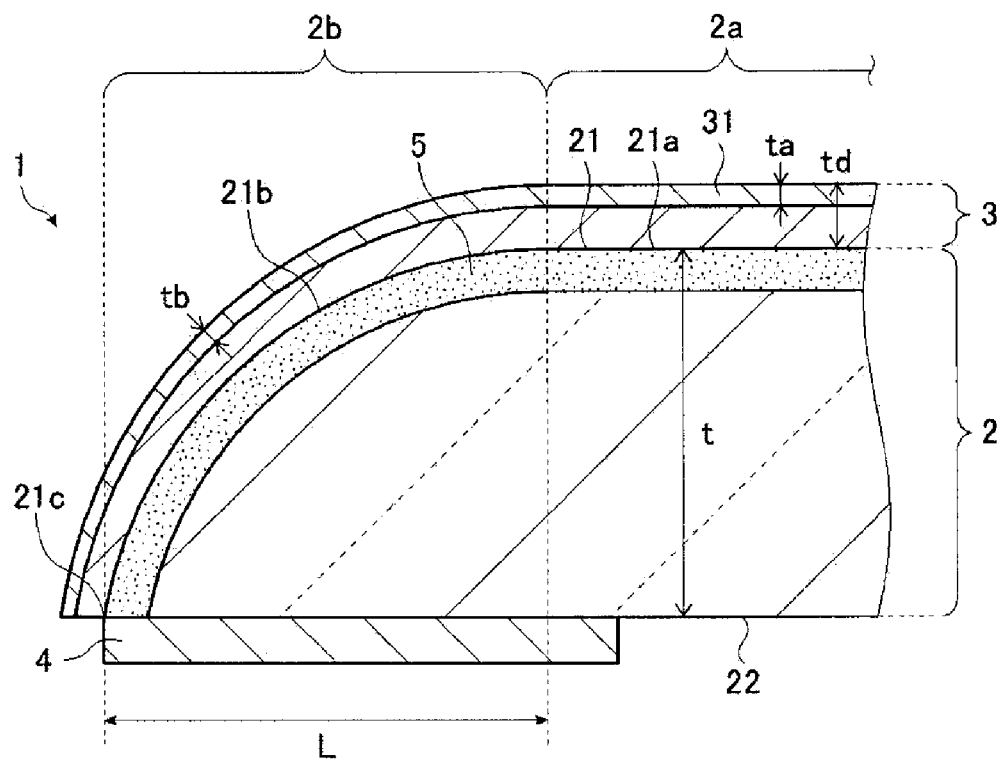
FIG. 1 is a sectional view of a glass plate structure.

FIG. 1 is a sectional view of a glass plate structure 1. The glass plate structure 1 has a glass plate 2, an antireflection film 3, and a print portion 4.

The glass plate 2 has a central portion 2a including the center of the glass plate 2 and an end portion 2b which is connected to the central portion 2a.

The glass plate 2 has a first major surface 21 which is one major surface and a second major surface 22 which is the other major surface.

The first major surface 21 has a flat surface region 21a which is a region of the central portion 2a of the glass plate 2. The flat surface region 21a is a region where the first major surface 21 is flat in a cross section taken perpendicularly to it.

It can also be said that a portion, having the flat surface region 21a, of the glass plate 2 is the central portion 2a.

The first major surface 21 further has a curved surface region 21b which is a region of the end portion 2b of the glass plate 2. The curved surface region 21b and the flat surface region 21a are connected to each other. The curved surface region 21b is curved convexly (i.e., bow-shaped) in a cross section taken perpendicularly to the first major surface 21.

An end portion, bridging the curved surface region 21b of the first major surface 21 and the second major surface 22 may be chamfered. In the following, for convenience, this end portion is also referred to as an "end portion chamfered portion."

The length L of the end portion 2b of the glass plate 2 (i.e., a distance from the tip 2c of the glass plate 2 to the central portion 2a) in a cross section taken perpendicularly to the first major surface 21 is a distance in a direction that is parallel with the plane of the flat surface region 21a of the first major surface 21. The length L is, for example, 0.5 mm or longer and 5 mm or shorter and is preferably 1 mm or longer and 4 mm or shorter.

Such a length L is determined by measuring it with a contour measuring instrument (e.g., "Contour Record" produced by Tokyo Seimitsu Co., Ltd.) at a magnification 100× to 200×.

The second major surface 22 is a surface to be opposed to a display panel 103 (see FIG. 3, described later) and is a flat surface.

The thickness t of the glass plate 2 is a thickness t of the central portion 2a of the glass plate 2.

From the viewpoints of durability etc., the thickness t of the glass plate 2 is, for example, 0.5 mm or larger and is preferably 0.7 mm or larger. On the other hand, the thickness t of the glass plate 2 is preferably 3.0 mm or smaller, even preferably 2.5 mm or smaller, and further preferably 2.0 mm or smaller.

A thickness t of the glass plate 2 is determined by measuring it with a contour measuring instrument (e.g., "Contour Record" produced by Tokyo Seimitsu Co., Ltd.) at a magnification 100× to 200×.

The radius of curvature r (see FIG. 2) of the curved surface region 21b is 50% or more of the thickness t of the glass plate 2 and is preferably 60% or more. On the other hand, the radius of curvature r of the curved surface region 21b is preferably 200% or less of the thickness t of the glass plate 2 and is preferably 150% or less.

A radius of curvature r of the curved surface region 21b is determined by measuring it with a contour measuring instrument (e.g., "Contour Record" produced by Tokyo Seimitsu Co., Ltd.) at a magnification 100× to 200×.

Figure 2:
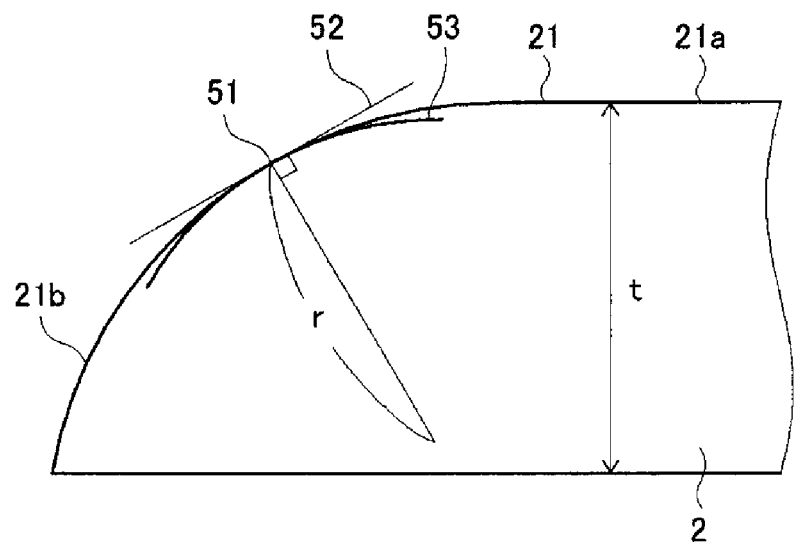
FIG. 2 is a schematic diagram showing how to determine a radius of curvature of a curved surface region.

FIG. 2 is a schematic diagram showing how to determine a radius of curvature r of the curved surface region 21b. As shown in FIG. 2, when a tangential line 52 is drawn at an arbitrary point 51 in the curved surface region 21b, the radius of a circular arc 53 passing through the tangential line 52 is a radius of curvature r. Radii of curvature r are determined in the same manner over the entire curved surface region 21b. The radius of curvature r is in the above range over the entire curved surface region 21b.

Let's return to the description with reference to FIG. 1.

There are no particular limitations on the size etc. of the glass plate 2 in a plan view (i.e., in a view as viewed from the side of the first major surface 21), and they are determined as appropriate according to, for example, a size etc. of a display panel 103 (described later).

The print portion 4 is formed on the second major surface 22. The print portion 4 is formed on the end portion 2b of the glass plate 2. The print portion 4 may also be formed on a part of the central portion 2a of the glass plate 2 so as to be continuous with its part formed on the end portion 2b of the glass plate 2. The print portion 4 may cover either all or a part of the above-mentioned end portion chamfered portion.

The antireflection film 3 is a laminate in which a low refractive index layer and a high refractive index layer are laminated alternately. The number of layers of the antireflection film 3 is twelve or smaller. The outermost layer 31 of the antireflection film 3 is a low refractive index layer or a high refractive index layer.

The antireflection film 3 is formed on the first major surface 21. More specifically, the antireflection film 3 is formed continuously on the flat surface region 21a and the curved surface region 21b of the first major surface 21.

End portion red coloration may be seen when the above-described glass plate structure 1 is viewed from the side of the first major surface 21.

More specifically, it can be said that end portion red coloration is taking place if a region where the x value of the Yxy color system is 0.33 or larger continues over 0.1 mm or more in the curved surface region 21b on which the antireflection film 3 is formed (refer to "Inventive Examples").

However, in the embodiment, the total thickness td of the antireflection film 3 in the flat surface region 21a is 400 nm or smaller and the thickness to of the outermost layer 31 of the antireflection film 3 in the flat surface region 21a is 90 nm or larger. With this measure, end portion red coloration can be suppressed even in a case that the number of layers of the antireflection film 3 is as small as 12 or smaller.

It is inferred that this is caused by a phenomenon that the reflectance of light including red wavelengths can be reduced by employing such an antireflection film 3.

The individual portions of the glass plate structure 1 is described below in more detail.

<Glass Plate>

Examples of glass kind of the glass plate 2 include soda-lime glass and aluminosilicate glass ($SiO_2$—$Al_2O_3$—$Na_2O$-type glass).

Where chemically strengthening treatment (described later) is performed, a glass for chemical strengthening (e.g., "Dragontrail" (registered trademark)) having aluminosilicate glass as base glass can also be used preferably.

<<Grinding>>

As described above, the curved surface region 21b which is a curved portion of the first major surface 21 is provided in the end portion 2b of the glass plate 2. For example, the curved surface region 21b is formed by grinding a blank plate of the glass plate 2 using a rotary whetstone.

Conditions (whetstone count, working rate, grinding depth, etc.) of the grinding using a whetstone are selected as appropriate according to a desired radius of curvature r of the curved surface region 21b. This grinding may be carried out by performing rough working first using a whetstone having a large grain size and then performing finishing working using a whetstone having a small grain size in such a manner that the number of steps does not become so large that the working is made too complex.

<<Antiglare Treatment>>

It is preferable that an antiglare layer 5 is provided on the first major surface 21 of the glass plate 2.

The antiglare layer 5 is a layer including the first major surface 21. Where the antiglare layer 5 is provided on the glass plate 2, the first major surface 21 has an uneven structure.

The antiglare layer 5 is formed by performing antiglare treatment on a blank plate of the glass plate 2.

There are no particular limitations on the method of antiglare treatment, examples of the method include: a method of etching the surface layer of a blank plate of the glass plate 2; and a method of applying a coating liquid containing fine particles and a matrix to the surface of a blank plate of the glass plate 2 and then curing the matrix.

For example, the antiglare layer 5 may be a layer corresponding to the "underlayer" that is described in paragraphs [0023]-[0036] of WO 2017-038868 (hereinafter referred to as "Referential document 1" for convenience).

In this case, the antiglare layer 5 is formed by forming a coating film by applying a prescribed paint composition on a blank plate of the glass plate 2 and then firing the coating film. More specifically, the antiglare layer 5 is formed by the method described in paragraphs [0047]-[0124] of Referential document 1.

<<Chemically Strengthening Treatment>>

It is preferable that the glass plate 2 be subjected to chemically strengthening treatment.

In performing chemically strengthening treatment, a glass for chemical strengthening is used as a glass kind.

A typical example method of chemically strengthening treatment is a method of performing ion exchange treatment by immersing glass in a $KNO_3$ molten salt and then cooling resulting glass to about room temperature. Treatment conditions such as a temperature of the $KNO_3$ molten salt and an immersion time may be set so that the surface compressive stress (CS) of a compressive stress layer and the depth of the compressive stress layer (DOL) become equal to desired values.

The surface compressive stress (CS) of a compressive stress layer is preferably 500 MPa or larger, even preferably 600 MPa or larger, and further preferably 700 MPa or larger. On the other hand, the surface compressive stress (CS) of a compressive stress layer is preferably 1,300 MPa or smaller.

The depth of a compressive stress layer (DOL) is preferably 10 μm or larger, even preferably 15 μm or larger, further preferably 20 μm or larger, and particularly preferably 25 μm or larger.

<Antireflection Film>

The antireflection film 3 is formed on the first major surface 21 of the glass plate 2. This makes it possible to suppress reflection of light and thereby makes a display image of a display panel 103 (describer later) clear.

The antireflection film 3 is a laminate in which a high refractive index layer and a low refractive index layer are laminated alternately. The number of layers of the antireflection film 3 is twelve or smaller and preferably nine or smaller. The number of layers of the antireflection film 3 is even preferably four or larger and further preferably four, six, or eight.

Each high refractive index layer is a layer whose refractive index at a wavelength 550 nm is 1.9 or higher. Each low refractive index layer is a layer whose refractive index at the wavelength 550 nm is 1.6 or lower.

There are no particular limitations on the materials of the high refractive index layers and the low refractive index layers; their materials can be selected taking into consideration a required degree of antireflectivity, a required level of productivity, and other factors.

Preferable examples of materials constituting the high refractive index layers include ones containing at least one kind selected from the group consisting of niobium, titanium, zirconium, tantalum, and silicon. More specifically, preferable examples include materials such as niobium oxide ($Nb_2O_5$), titanium oxide ($TiO_2$), zirconium oxide ($ZrO_2$), tantalum oxide ($Ta_2O_5$), and silicon nitride.

Examples of materials constituting the low refractive index layers include materials containing silicon. Specific examples include silicon oxide ($SiO_2$), materials containing a mixed oxide of Si and Sn, materials containing a mixed oxide of Si and Zr, and materials containing a mixed oxide of Si and Al.

The outermost layer 31 of the antireflection film 3 is preferably a low refractive index layer and even preferably a low refractive index layer containing silicon oxide.

As described above, the total thickness td of the antireflection film 3 in the flat surface region 21a is 400 nm or smaller and the thickness to of the outermost layer 31 of the antireflection film 3 in the flat surface region 21a is 90 nm or larger. End portion red coloration can be suppressed by this measure.

For a reason that end portion red coloration can be suppressed more, the total thickness td of the antireflection film 3 in the flat surface region 21a is preferably 380 nm or smaller and even preferably 340 nm or smaller though as described later these features depend on the number of layers of the antireflection film 3. On the other hand, the total thickness td is preferably 200 nm or larger and even preferably 220 nm or larger.

For the same reason, that is, since end portion red coloration can be suppressed more, the thickness ta of the outermost layer 31 of the antireflection film 3 in the flat surface region 21a is preferably 95 nm or larger and even preferably 100 nm or larger. On the other hand, from the viewpoint of giving the antireflection film 3 a satisfactory antireflection property, the thickness ta is preferably 135 nm or smaller, even preferably 130 nm or smaller, and further preferably 125 nm or smaller.

More specifically, where, for example, the number of layers of the antireflection film 3 is four or five, the total thickness td of the antireflection film 3 in the flat surface region 21a is preferably 285 nm or smaller and even preferably 265 nm or smaller. On the other hand, the total thickness td is preferably 245 nm or larger and even preferably 250 nm or larger.

In this case, the thickness ta of the outermost layer 31 of the antireflection film 3 in the flat surface region 21a is preferably 95 nm or larger and even preferably 100 nm or larger. On the other hand, the thickness ta is preferably 130 nm or smaller, even preferably 110 nm or smaller, and further preferably 102.5 nm or smaller.

Where the thicknesses of the antireflection film 3 are in these ranges, the color of the end portion 2b of the glass plate 2 can be set in a proper range and the color and the reflectance of the central portion 2a of the glass plate 2 can be set in proper range.

For the same reason, where the number of layers of the antireflection film 3 is six or seven, the total thickness td of the antireflection film 3 in the flat surface region 21a is preferably 290 nm or smaller and even preferably 285 nm or smaller. On the other hand, the total thickness td is preferably 250 nm or larger and even preferably 255 nm or larger.

In this case, the thickness ta of the outermost layer 31 of the antireflection film 3 in the flat surface region 21a is preferably 95 nm or larger and even preferably 100 nm or larger. On the other hand, the thickness ta is preferably 130 nm or smaller and even preferably 120 nm or smaller.

For the same reason, where the number of layers of the antireflection film 3 is eight or nine, the total thickness td of the antireflection film 3 in the flat surface region 21a is preferably 350 nm or smaller and even preferably 340 nm or smaller. On the other hand, the total thickness td is preferably 280 nm or larger and even preferably 300 nm or larger.

In this case, the thickness ta of the outermost layer 31 of the antireflection film 3 in the flat surface region 21a is preferably 95 nm or larger and even preferably 100 nm or larger.

On the other hand, the thickness ta is preferably 140 nm or smaller and even preferably 130 nm or smaller.

The thickness of each of the layers, other than the outermost layer 31, of the antireflection film 3 is adjusted as appropriate taking colors other than red, the reflectance, etc. into consideration.

There are no particular limitations on the method for forming the antireflection film 3. Examples of the method include sputtering such as pulse sputtering, AC sputtering, and digital sputtering, CVD (chemical vapor deposition), ALD (atomic layer deposition), and evaporation.

For example, in the case of film formation by pulse sputtering, a film is formed by setting the glass plate 2 in a chamber containing a mixed gas atmosphere of inert gas and oxygen gas and selecting, for this setting, a target that is suitable for obtaining a desired composition.

In forming an antireflection film 3 by, for example, sputtering, each layer of the antireflection film 3 is formed less easily in the curved surface region 21b which is curved convexly than in the flat surface region 21a.

Thus, the thickness of each layer is made smaller in the curved surface region 21b than in the flat surface region 21a.

As a result, the ratio, tb/ta, of a thickness tb of the outermost layer 31 of the antireflection film 3 in the curved surface region 21b to a thickness ta of that in the flat surface region 21a becomes 100% or smaller. For example, the ratio tb/ta is 95% or smaller and preferably 85% or smaller. On the other hand, the ratio tb/ta is preferably 60% or larger and even preferably 70% or larger.

It is inferred that the ratio of a thickness of each of the layers other than the outermost layer 31 in the curved surface region 21b to a thickness of that layer in the flat surface region 21a satisfies the above range of the ratio tb/ta of the outermost layer 31.

A thickness of each layer of the antireflection film 3 is determined by a measurement performed by a scanning electron microscope (SEM) at a magnification 50,000×. An example SEM is "SU-70" produced by Hitachi High-Tech Corporation.

However, since the thickness of each layer of the antireflection film 3 in the curved surface region 21b increases as the position comes closer to the central portion 2a and decreases as the position comes closer to the tip 2c of the glass plate 2, a thickness at the middle point of the above-mentioned length L is employed as a thickness of each layer.

<Print Portion>

For example, the print portion 4 is formed so as to assume a frame shape on the end portion 2b of the glass plate 2. As a result, the print portion 4 hides interconnections (not shown) connected to a display panel 103 (described later) and other things so that they are not seen from the side of the first major surface 21 of the glass plate 2.

The print portion 4 is formed by printing colored ink on the glass plate 2.

Examples of the method for printing colored ink on the glass plate 2 include a bar coating method, a reverse coating method, a gravure coating method, a die coating method, a roll coating method, a screen method, a photolithography method, an offset printing method using a film, a pad, a roll, or the like, an ink jet printing method, and a spray printing method. Among these example printing methods, the screen method is preferable because it enables simple printing, for example.

Although black ink and white ink are used frequently, there are no particular limitations on the color of the colored ink. The purpose of use of the colored ink is not limited to a decoration purpose and the colored ink may have other functions such as transmitting light having a particular wavelength.

There are no particular limitations on the kind of colored ink, usable examples of which are an inorganic ink containing ceramic (ceramic fired body) or the like and an organic ink containing an organic resin and a color material such as a dye or a pigment.

Examples of ceramic to be contained in an inorganic ink include oxides such as chromium oxide and iron oxide, carbides such as chromium carbide and tungsten carbide, carbon black, and mica.

There are no particular limitations on the color material (dye or pigment) to be contained in an organic ink.

Examples of the organic resin to be contained in an organic ink include homopolymers such as epoxy resins, acrylic resins, polyethylene terephthalate, polyether sulfone, polyarylate, polycarbonate, phenol resin, acrylonitrile-butadiene-styrene resin, polyurethane, polymethyl methacrylate, polyvinyl, polyvinyl butyral, polyether ether ketone, polyethylene, polyester, polypropylene, polyamide, and polyimide; and copolymers of a monomer of each of the above resins and a monomer that can be copolymerized with the former.

Of an inorganic ink and an organic ink, an organic ink is preferable because of a low firing temperature and organic inks containing a pigment are even preferable from the viewpoint of resistance to chemicals.

[Vehicular Display Device]

Figure 3:
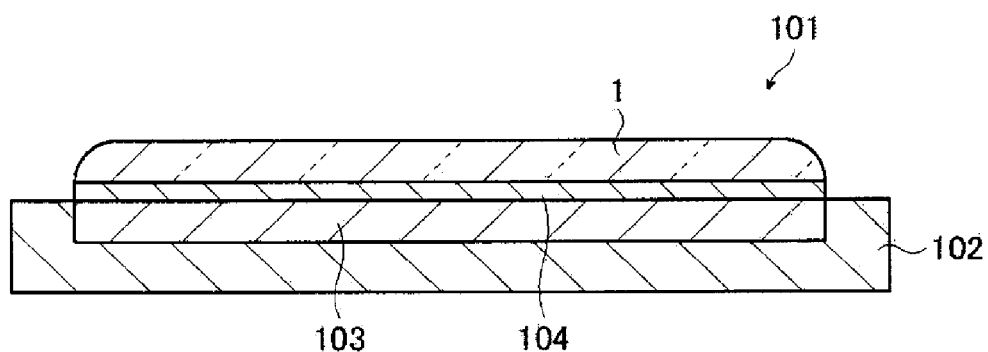
FIG. 3 is a sectional view of a vehicular display device.

Next, referring to FIG. 3, a vehicular display device 101 that is used in a state that it is installed in a vehicle is described as a display device using the glass plate structure 1.

FIG. 3 is a sectional view of the vehicular display device 101. For example, the vehicular display device 101 is a car navigation device or a rear sheet entertainment (RSE) device which allows passengers sitting in the rear sheet to view a video etc.

The vehicular display device 101 has a body 102 that houses individual units. A display panel 103 is disposed inside the body 102. For example, the display panel 103 is a liquid crystal panel, an organic EL (electroluminescence) panel, or an electronic ink-type panel; it may have a touch panel or the like.

The glass plate structure 1 is stuck to the display panel 103 via an adhesive layer 104. As such, the glass plate structure 1 functions as a cover glass for the display panel 103.

An example of the adhesive layer 104 is a layer that is made of a transparent resin that is obtained by curing a liquid curable resin composition. The adhesive layer 104 may be an OCA (optical clear adhesive) film or tape. The thickness of the adhesive layer 104 is preferably 5 μm or larger and even preferably 50 μm or larger. On the other hand, the thickness of the adhesive layer 104 is preferably 400 μm or smaller and even preferably 200 μm or smaller.

EXAMPLES

The invention is described in a specific manner below using Inventive Examples. However, the invention is not limited to the following Inventive Examples. Examples 1, 3, and 5 are Inventive Examples and Examples 2, 4, 6, and 7 are Comparative Examples.

Example 1

A glass plate structure 1 according to Example 1 was manufactured in the following manner.
<Preparation of Glass Plate>
First, a glass for chemical strengthening ("Dragontrail" produced by AGC Inc.) was prepared as a blank plate to become a glass plate 2. The thus-prepared blank plate was subjected to grinding, antiglare treatment, and chemically strengthening treatment in this order, whereby a rectangular glass plate 2 (thickness t: 1.3 mm, size: 250 mm×145 mm) having an antiglare layer 5 was obtained.
<<Grinding>>
The prepared blank plate was ground using a rotary whetstone so that in a glass plate 2 to be obtained the length L of an end portion 2b would become 2 mm and the radius of curvature r of a curved surface region 21b would have a maximum value 5 mm and a minimum value 0.7 mm.
<<Antiglare Treatment>>
An antiglare layer 5 was formed by preparing a coating liquid, using it in coating, and subjecting it to firing in the same manners as in Example 3 of Referential document 1 (WO 2017/038868).

More specifically, first, a coating liquid (C) described in paragraphs [0165]-[0167] of Referential document 1 was prepared.

Then the temperature and the humidity in a coating booth of an electrostatic coating machine were set at 25° C.±1° C. and 50%±10%, respectively.

The ground blank plate was heated to 30° C.±3° C. in advance and put on a chain conveyor of the electrostatic coating machine via a conductive substrate. While the blank plate was conveyed at a constant speed by the chain conveyor, the coating liquid (C) in a temperature range 25° C.±1° C. was applied to the surface to become a first major surface 21 of the glass plate 2 by an electrostatic coating method. The coating conditions (coating liquid amount, cup rotation speed, nozzle height, cup diameter, voltage, and number of times of coating) of Example 3 shown in Table 1 of Referential document 1 were employed as conditions of the electrostatic coating method. Then firing was performed in the air at 450° C. for 30 minutes.
<<Chemically Strengthening Treatment>>
The blank pate that had been subjected to the grinding and the antiglare treatment was subjected to chemically strengthening treatment. The chemically strengthening treatment was performed by immersing the entire glass plate in a $KNO_3$ molten salt so that the depth of a compressive stress layer (DOL) and the surface compressive stress (CS) of the compressive stress layer became equal to 35 μm and 750 MPa, respectively.
<Formation of Antireflection Film>
A 6-layer antireflection film 3 in which high refractive index layers (niobium oxide layers) and low refractive index layers (silicon oxide layers) were laminated alternately was formed by the following method on the first major surface 21 of the glass plate 2 obtained above. The thicknesses of the individual layers in the flat surface region 21a were as shown in Table 1.

The glass plate 2 was fixed to an intrachamber rotary jig of a load lock-type sputtering depositing machine produced by Synchron Co., Ltd.

An Nb thin film was formed using Nb as a sputtering source. Subsequently, the Nb thin film was oxidized by introducing oxygen gas as a radical source. These two operations were performed repeatedly for a time that was suitable for an intended thickness while the glass plate 2 was rotated. An Nb target measuring 705 mm×147 mm was used as a sputtering target. As for the sputtering conditions, the pressure was 0.2 Pa, the drum rotation speed was 100 rpm, and the output power was 5.5 kW. A high refractive index layer (first layer) made of niobium oxide ($Nb_2O_5$) was formed in this manner.

Next, a film was formed on the first layer using Si as a sputtering source and oxygen gas as a radical source. This was done by forming an Si thin film first and then oxidizing it with oxygen gas. These two operations were performed repeatedly for a time that was suitable for an intended thickness while the glass plate 2 was rotated. An Si target measuring 705 mm×147 mm was used as a sputtering target. As for the sputtering conditions, the pressure was 0.2 Pa, the drum rotation speed was 100 rpm, and the output power was 7.5 kW. In this manner, a low refractive index layer (second layer) made of silicon oxide ($SiO_2$) was formed on the first layer.

Then a high refractive index layer (third layer) made of niobium oxide ($Nb_2O_5$) was formed on the second layer in the same manner as the first layer was formed.

Then a low refractive index layer (fourth layer) made of silicon oxide ($SiO_2$) was formed on the third layer in the same manner as the second layer was formed.

A high refractive index layer (fifth layer) made of niobium oxide ($Nb_2O_5$) was thereafter formed on the fourth layer in the same manner as the first layer was formed.

Subsequently, a low refractive index layer (sixth layer) made of silicon oxide ($SiO_2$) was formed on the fifth layer in the same manner as the second layer was formed. This sixth layer was an outermost layer 31 of an antireflection film 3.

As described above, in the curved surface region 21b which is curved convexly, each layer of the antireflection film 3 is deposited less easily than in the flat surface region 21a. As a result, each layer formed is thinner in the curved surface region 21b than in the flat surface region 21a.

A ratio tb/ta of the outermost layer 31 is shown in Table 1 below. The ratio of the thickness in the curved surface region 21b to the thickness in the flat surface region 21a of each of the layers other than the outermost layer 31 was similar to the ratio tb/ta of the outermost layer 31.
<Formation of Print Portion>
A frame-shaped print portion 4 having a width 10 mm was formed on the second major surface 22 of the glass plate 2.

More specifically, first, black ink was applied at a thickness 5 μm using a screen printing machine and dried by keeping its temperature at 150° C. for 10 minutes, whereby a first print layer was formed. Subsequently, a second print layer was formed on the first print layer according to a similar procedure in which black ink was applied at a thickness 5 μm and dried by keeping its temperature at 150° C. for 40 minutes. A print portion 4 in which the second print layer was laminated on the first print layer was thus formed. The black ink used was "HFGV3RX01" (tradename, produced by Seiko Holdings Corporation).

Example 2

A glass plate structure 1 was manufactured in the same manner as in Example 1 except that the thickness, in the flat surface region 21a, of each of the first layer to the sixth layer of an antireflection film 3 was made different than in Example 1 by changing the film formation time.

In Example 2, the shape (i.e., length L and radius of curvature r) of the curved surface region 21b was the same as in Example 1. As a result, the ratio tb/ta had the same value as in Example 1 and hence the thickness tb was changed (these also apply to the following Examples).

Example 3 and Example 4

A 4-layer antireflection film 3 was formed in which high refractive index layers (niobium oxide layers) and low refractive index layers (silicon oxide layers) were laminated alternately. Thicknesses of the individual layers in the flat surface region 21a were as shown in Table 1 below.

A glass plate structure 1 was obtained in the same manner as in Example 1 except the above differences.

Example 5 and Example 6

An 8-layer antireflection film 3 was formed in which high refractive index layers (niobium oxide layers) and low refractive index layers (silicon oxide layers) were laminated alternately. Thicknesses of the individual layers in the flat surface region 21a were as shown in Table 1 below.

A glass plate structure 1 was obtained in the same manner as in Example 1 except the above differences.

Example 7

A 7-layer antireflection film 3 was formed in which high refractive index layers (niobium oxide layers) and low refractive index layers (silicon oxide layers) were laminated alternately. However, a first layer and a seventh layer (outermost layer 31) were both made a low refractive index layer (silicon oxide layer). Thicknesses of the individual layers in the flat surface region 21a were as shown in Table 1 below.

A glass plate structure 1 was obtained in the same manner as in Example 1 except the above differences.

[Evaluations]

The glass plate structures 1 of Examples 1 to 7 were subjected to the following evaluations. Evaluation results are shown in Table 1 below.

<Suppression of End Portion Red Coloration>

Values of x in the Yxy color system of the curved surface region 21b, on which the antireflection film 3 was formed, of the glass plate structure 1 were determined.

Figure 4:
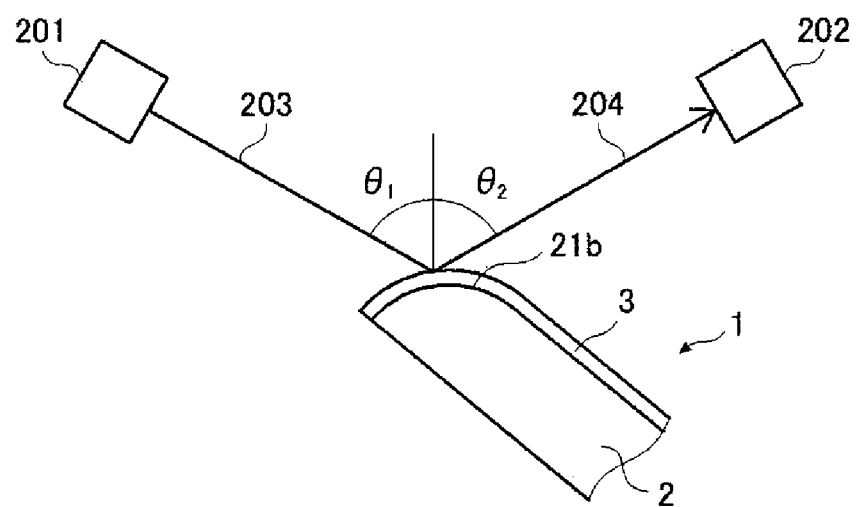
FIG. 4 is a schematic diagram showing a positional relationship between a light source and a detector.

This was done with an arrangement in which as shown in FIG. 4 an incident angle $\theta_1$ of light 203 emitted from a light source 201 and shining on the glass plate structure 1 was set the same as an angle $\theta_2$ of light 204 that was reflected from the glass plate structure 1 and detected by a detector 202. The angles $\theta_1$ and $\theta_2$ were set in a range of 10° to 80°.

Illumination having a spectrum in a visible range was used as the light source 201. More specifically, white light LED illumination ("OPF-S100X100W-PS" produced by Optex FA Co., Ltd.) was used. Since wavelength intensity of a white LED is not constant in a visible wavelength range, correction values were generated by obtaining spectrum data using a white calibration plate and Yxy values in the Yxy color system were calculated using the thus-obtained correction values.

A spectroradiometer ("SR-5000" produced by Topcon Technohouse Corporation) was used as the detector 202.

An evaluation result "A" was given if a region where the x value did not continue to be 0.33 or larger over 0.1 mm or longer, and an evaluation result "B" was given if a region where the x value continued to be 0.33 or larger over 0.1 mm or longer. Results are shown in Table 1 below. It can be judged that end portion red coloration is suppressed if the evaluation result is "A."

<Antireflection>

An antireflection characteristic of the antireflection film 3 formed in the curved surface region 21b was evaluated.

More specifically, a Y value (SCI) in the Yxy color system of the end portion 2b, on which the print portion 4 and the antireflection film 3 were formed, of the glass plate 2 was measured using a spectrocolorimeter ("CM-2600D" produced by Konica Minolta, Inc.)

An evaluation result "A" was given if the Y value was 2.0 or smaller, and an evaluation result "B" was given if the Y value was larger than 2.0. Results are shown in Table 1 below. It can be judged that the antireflection characteristic is superior if the evaluation result is "A."

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Antireflection film | Number of layers | 6 | 6 | 4 | 4 | 8 | 8 | 7 |
| | Thickness in flat surface region (nm) 1st layer | 9.2 | 9.2 | 9.5 | 9.5 | 6.8 | 6.5 | 38.3 |
| | 2nd layer | 56.0 | 45.0 | 42.0 | 42.0 | 40.0 | 70.0 | 103.6 |
| | 3rd layer | 40.5 | 41.0 | 106.0 | 106.0 | 13.0 | 22.0 | 171.1 |
| | 4th layer | 23.1 | 19.0 | 100.0 | 85.0 | 46.3 | 43.0 | 98.5 |
| | 5th layer | 39.1 | 36.0 | — | — | 32.0 | 35.0 | 169.5 |
| | 6th layer | 110.0 | 85.0 | — | — | 50.0 | 40.0 | 101.9 |
| | 7th layer | — | — | — | — | 22.0 | 21.0 | 82.9 |
| | 8th layer | — | — | — | — | 120.0 | 80.0 | — |
| | Total thickness td | 277.9 | 235.2 | 257.5 | 242.5 | 330.1 | 317.5 | 765.7 |
| | Thickness ta of outermost layer | 110.0 | 85.0 | 100.0 | 85.0 | 120.0 | 80.0 | 82.9 |

TABLE 1-continued

| | | Ex. 1 | Ex. 2 | Ex. 3 | Ex. 4 | Ex. 5 | Ex. 6 | Ex. 7 |
|---|---|---|---|---|---|---|---|---|
| | Thickness in curved surface region (nm) Thickness tb of outermost layer | 88 | 68 | 80 | 68 | 96 | 64 | 66.3 |
| | Ratio tb/ta | 80% | 80% | 80% | 80% | 80% | 80% | 80% |
| Evaluations | Suppression of end portion red coloration | A | B | A | B | A | B | B |
| | Antireflectivity | A | A | A | A | A | B | B |

[Summary of Evaluation Results]

As seen from Table 1, end portion red coloration was suppressed in Examples 1, 3, and 5 in which the total thickness td of the antireflection film 3 in the flat surface region 21a was 400 nm or smaller and the thickness ta of the outermost layer 31 of the antireflection film 3 in the flat surface region 21a was 90 nm or larger.

In contrast, suppression of end portion red coloration was insufficient in Examples 2, 4, 6, and 7 in which the thickness ta of the outermost layer 31 of the antireflection film 3 in the flat surface region 21a was not larger than or equal to 90 nm.

Although the invention has been described above in detail by referring to the particular embodiment, it is apparent to those skilled in the art that various changes and modifications are possible without departing from the spirit and scope of the invention.

DESCRIPTION OF SYMBOLS

1: Glass plate structure
2: Glass plate
2a: Central portion of glass plate
2b: End portion of glass plate
2c: Tip of glass plate
21: First major surface of glass plate
21a: Flat surface region of first major surface
21b: Curved surface region of first major surface
22: Second major surface of glass plate
3: Antireflection film
31: Outermost layer of antireflection film
4: Print portion
51: Point
52: Tangential line
53: Circular arc
101: Vehicular display device
102: Body
103: Display panel
104: Adhesive layer
r: Radius of curvature of curved surface region
t: Thickness of glass plate
ta: Thickness of outermost layer of antireflection film in flat surface region
tb: Thickness of outermost layer of antireflection film in curved surface region
td: Total thickness of antireflection film in flat surface region
L: Length of end portion

The invention claimed is:

1. A glass plate structure comprising:
a glass plate comprising a first major surface and a second major surface;
an antireflection film provided on or above the first major surface; and
a print portion provided on the second major surface,
wherein the first major surface comprises: a curved surface region that is a region of an end portion of the glass plate, is curved convexly, and has a radius of curvature r that is 50% or more of a thickness t of the glass plate; and a flat surface region that is connected to the curved surface region,
the antireflection film is a laminate in which a high refractive index layer and a low refractive index layer are laminated alternately,
the number of layers of the antireflection film is 12 or smaller,
a total thickness of the antireflection film in the flat surface region is 400 nm or smaller,
a thickness of an outermost layer of the antireflection film in the flat surface region is 90 nm or larger,
a thickness of the outermost layer of the antireflection film in the curved surface region is 80 nm or larger, and
a Y value in the Yxy color system of the curved surface region on which the antireflection film is provided is 2.0 or less.

2. The glass plate structure according to claim 1, wherein the glass plate is subjected to chemically strengthening treatment.

3. The glass plate structure according to claim 1, further comprising an antiglare layer provided on the first major surface.

4. The glass plate structure according to claim 1, wherein the outermost layer of the antireflection film is a low refractive index layer comprising silicon oxide.

5. The glass plate structure according to claim 1, wherein the number of layers of the antireflection film is nine or smaller.

6. The glass plate structure according to claim 1, wherein the number of layers of the antireflection film is four or larger.

7. A vehicular display device comprising a display panel and the glass plate structure according to claim 1 that covers the display panel.

* * * * *